United States Patent
Hayford

[11] 3,719,747
[45] March 6, 1973

[54] HYDROTHERMAL PROCESS FOR MAKING HYDROGEN FLUORIDE

[75] Inventor: John S. Hayford, Stamford, Conn.

[73] Assignee: Stauffer Chemical Company, New York, N.Y.

[22] Filed: March 4, 1971

[21] Appl. No.: 121,087

[52] U.S. Cl. .................423/485, 423/331, 423/336
[51] Int. Cl. ...........................C01b 7/22, C01b 33/24
[58] Field of Search .................23/153, 182 V, 110 R

[56] References Cited

UNITED STATES PATENTS

| | | | |
|---|---|---|---|
| 2,819,151 | 1/1958 | Flemmert | 23/182 V |
| 2,886,414 | 5/1959 | Secord | 23/182 V |
| 3,017,246 | 1/1962 | Kamlet | 23/153 |
| 3,065,050 | 11/1962 | Baeumert | 23/153 X |
| 3,110,562 | 11/1963 | Hinkle, Jr. | 23/153 |
| 3,116,971 | 1/1964 | Hrishikesan et al. | 23/110 R X |
| 3,203,759 | 8/1965 | Flemmert | 23/153 X |

Primary Examiner—Edward Stern
Attorney—Wayne C. Jaeschke, Martin Goldwasser and Daniel S. Ortiz

[57] ABSTRACT

This invention provides a hydrothermal process for the manufacture of hydrogen fluoride. The process comprises adding a mixture of calcium fluoride and silica to a reaction zone, providing a heat source to supply the necessary water to be reacted with the calcium fluoride silica mixture and to heat the mixture to a temperature of between about 3500° and 5000°F., and recovering the gaseous hydrogen fluoride product.

2 Claims, 1 Drawing Figure

PATENTED MAR 6 1973 3,719,747
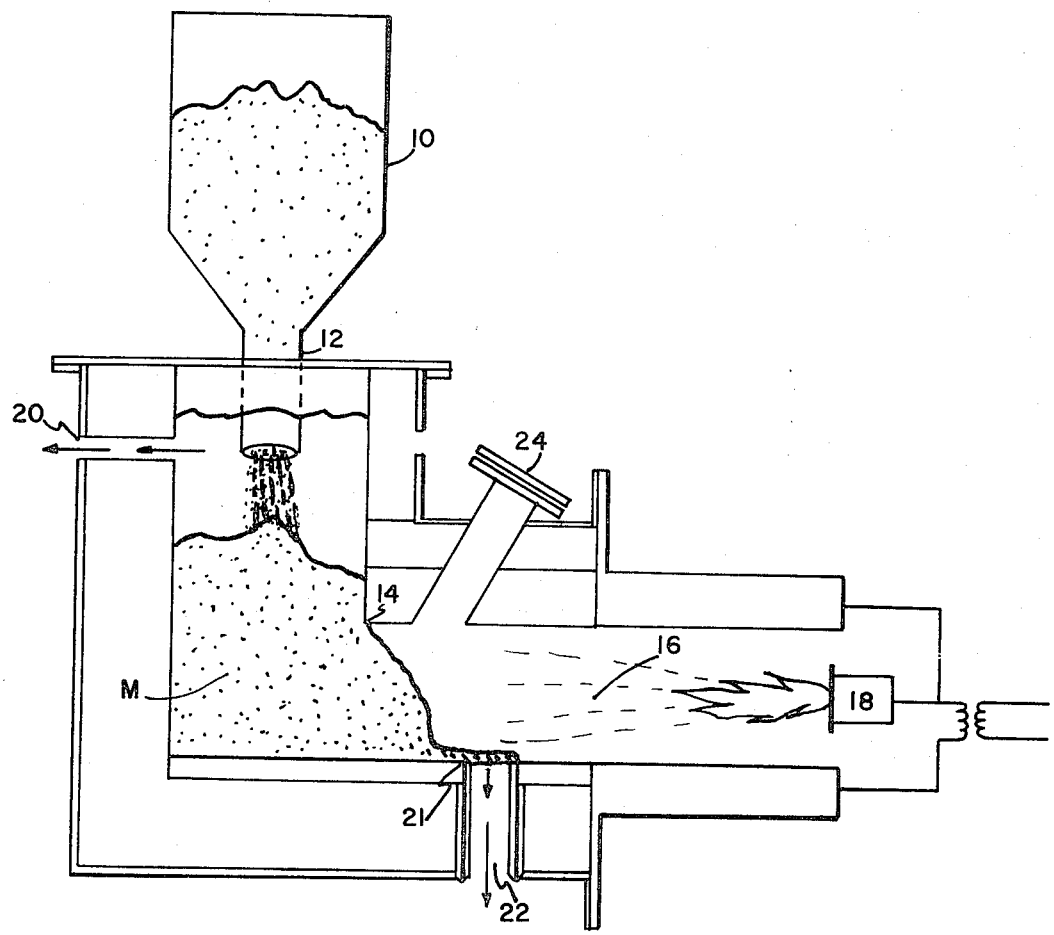
INVENTOR.
JOHN S. HAYFORD

HYDROTHERMAL PROCESS FOR MAKING HYDROGEN FLUORIDE

This invention relates to a hydrothermal process for preparing hydrogen fluoride. The process utilizes an electrically augmented flame burner which burns combustible gases and by passing an electric current through the flame as a diffuse discharge, flame temperatures of 4000°–9000° can be generated.

Hydrogen fluoride (HF) has been commonly produced by a reaction of fluorspar ($CaF_2$) with sulfuric acid. This process has produced a good quality and quantity of hydrogen fluoride at a good yield of the raw materials used. However, the sulfuric acid used is expensive and considered uneconomical by some in the production of hydrogen fluoride.

Also, in the production of hydrogen fluoride, the present processes utilize an acid grade fluorspar (i.e 97% + $CaF_2$). This material is short in supply and is quite expensive.

Another problem of producing hydrogen fluoride economically and practically is that it is preferable to have the plant in which the hydrogen fluoride is produced, located in an area where both the fluorspar or calcium fluoride, and sulfuric acid are readily available. The two materials are not generally located in the same area. Consequently, the fluorspar or the sulfuric acid will have to be shipped at a greater expense to the place of manufacture, and thus, the hydrogen fluoride is produced less economically.

In view of these problems of producing hydrogen fluoride, there have been several processes which have attempted to substitute or modify the process so that it would be economical and practical to use other less expensive materials to produce the hydrogen fluoride. Accordingly, processes have been developed to replace or substitute for at least one of the standard components for producing hydrogen fluoride.

Accordingly, the primary object of the present invention is to provide a process for preparing hydrogen fluoride which is economical and practical, and yet one that provides a product which has the same qualities as that produced with sulfuric acid and calcium fluoride.

The present invention accomplishes these objects with a hydrothermal process which comprises reacting fluorspar, calcium fluoride ($CaF_2$); and silica ($SiO_2$), at a high temperature maintained above about 3500° and more preferably between about 3500° and about 5000°F. The heat is provided by an electrically augmented burner in which a hydrocarbon gas such as methane ($CH_4$) or propane ($C_3H_8$), or a fuel oil is burned in sufficient quantities to provide the water, in vapor form, for the reaction as well as the necessary high temperatures to react the components to produce hydrogen fluoride.

The hydrothermal process of the present invention can utilize any suitable inorganic fluorine-containing compound which hydrolyzes at elevated temperatures to form hydrogen fluoride. Preferred sources of fluorine are, of course, low grade or waste materials such as low grade fluorspar (less than 90% $CaF_2$) or silicon tetrafluoride ($SiF_4$). A major impurity of low grade fluorspar is silica ($SiO_2$) which is required in the reaction. Another impurity in low grade fluorspar is $CaCO_3$ which is not detrimental to the reaction and can be converted to $CaF_2$ by reacting it with waste $H_2SiF_6$ — HF azeotrope from the process. $SiF_4$ is a waste material which might be recovered from processing of phosphate rock to make phosphoric acid.

The advantage of using a low grade fluorspar is obvious in that it is less expensive than the standard acid fluorspar used to produce hydrogen fluoride.

In preparing hydrogen fluoride without sulfuric acid and with a standard combustion burner, fluorspar, silica and water are reacted to form hydrogen fluoride according to the following equation:

$$CaF_2 + SiO_2 + H_2O \xrightarrow{Heat} CaSiO_3 + 2HF \qquad (I)$$

The source of the water is the combustion of a hydrocarbon fuel with a free oxygen containing gas such as air, oxygen, oxygen enriched air or the like. In order to react fluorspar, silica and water to form hydrogen fluoride according to reaction (I) temperatures in excess of 2500°–3000°F. are required to obtain a high degree of water conversion. Also considerable heat input is required to supply (a) the sensible heat for the solid reactants, (b) the heat of reaction and (c) the heat losses. The higher the reaction temperature, the greater is this heat requirement. When burning a hydrocarbon gas, such as methane, in an ordinary burner, flame temperatures above 2800°F. are extremely difficult to obtain. Also, the amount of fuel needed to supply the heat requirements produces water in considerable excess of that required for carrying out reaction (I). This large excess of water requires costly equipment to separate it from the product hydrogen fluoride. Therefore, it is desirable to heat the reaction components to a sufficiently high temperature to obtain a high degree of water conversion while at the same time limiting the amount of water supplied to the reaction zone by the combustion of hydrocarbon gases or fuel oil.

According to the present invention, an electrically augmented burner is used to provide a heat source of temperatures ranging from about 4000° to about 9000°F. without burning an excess of a hydrocarbon to heat the reaction components to produce hydrogen fluoride. Thus, by the present process, hydrogen fluoride is produced, by the reaction of fluorspar and silica in substantially a free state, without any great problem of recovering the hydrogen fluoride product and without an excess of water that would have to be removed.

These objectives and advantages together with other advantages will be more apparent from a description of the process when considered in view of the accompanying drawing which is a schematic illustration of the present process for producing hydrogen fluoride.

Referring to the drawing, a mixture M of fluorspar ($CaF_2$) and silica ($SiO_2$), is fed from a hopper 10 and through a duct 12 into a reaction heating zone 14. The mixture M in the reaction zone 14 is heated by the heat supplied through a passage 16 from an electrically augmented flame burner 18. The temperature provided by the flame burner ranges from between about 4000°F. and about 9000°F. The burner burns hydrocarbon gases such as methane or propane, or a fuel oil with a free oxygen containing gas, upon the combustion of the hydrocarbon water vapor is formed along with other products of combustion such as $CO_2$ and $N_2$, which moves through the passage 16 to the reaction zone 14, and is mixed and reacted with the fluorspar and silica to produce the hydrogen fluoride (HF). The product gas HF along with $N_2$, $O_2$, CO, $CO_2$ and unreacted $H_2O$ is emitted through and from the bed mixture M, of $CaF_2$ and $SiO_2$ and out port 20. This effectively preheats the incoming mixture M. The product gas HF is mixed with inert gases and water vapor and can be recovered by any suitable manner, e.g., by condensation. The waste or molten slag 21 of the reaction mixture M is discharged from the reaction zone 14 through the passage 16 and out port 22. The molten slag 21 consists of calcium silicate, unreacted calcium fluoride and unreacted silica.

The temperature of the gas, produced by the burner as stated is between about 4000° and about 9000°F. The amount of heat supplied at this temperature to the reaction mixture of the calcium fluoride and silica must be sufficient to heat the reaction mixture to temperatures ranging between about 3500° and about 5000°F., which is sufficient to produce the gaseous product HF.

The temperature of the reaction mixture M can be determined in any suitable manner, e.g., by sighting with an optical pyrometer (not shown) into the reaction mixture M through a temperature port 24. Accordingly, more or less heat may be provided by the burner 18 as needed.

As indicated above, it is preferred but not critical that only the amount of water vapor which is necessary to be reacted with the calcium fluoride and silica to produce the hydrogen fluoride be formed by the combustion of hydrocarbon burned by the burner 18. With this arrangement, there is no problem of separating an excess of water, from the hydrogen fluoride gas product removed through and from the reaction mixture M through port 20 and recovered by any suitable means.

It is noted although an electrically augmented burner is described and illustrated in the drawing and described herein, that any effective source of heat for providing high temperatures between 4000° and 9000°F. without an excess of water can be used in the present process to produce hydrogen fluoride.

The following example is set forth to further illustrate the method of the present invention.

EXAMPLE 1

Hydrogen fluoride is prepared in equipment similar to that illustrated in the drawing.

A mixture of 290 pounds of fluorspar ($CaF_2$) and 137 pounds of silica ($SiO_2$ 30% excess) is fed into a reaction heating zone 14. The fluorspar consists of 217.5 pounds of $CaF_2$, 58 pounds of $SiO_2$, and 14.5 pounds of $CaCO_3$.

The fluorspar-silica mixture is heated in the reaction zone 14 by the heat supplied through passage 16 from an electrically augmented flame burner. The temperature of the flame of the burner is about 4500°F. and provides a temperature of 3500°F. for the reaction of the fluorspar and silica. The augmented flame burner burns about 25 pounds of methane ($CH_4$) per hour. The electrical power applied to the burner is 120 kilowatts and produces 406,000 BTUs while the combustion of the methane gas produces 594,000 BTUs. The heat input ratio of electrical power to combustion is 0.70. Further description of the operation of electrically augmented burners is not required herein since such operation is known to those skilled in the art; see, I&EC Process Design & Development, Vol. 6, p. 375, July 1967; and also see, International Science and Technology, p. 40, June 1962.

The amount of water generated by the combustion of the methane is 56.3 pounds. The water is in the form of water vapor and is passed through the passage 16 into the reaction zone 14 and mixed and reacted with the fluorspar and silica to produce the hydrogen fluoride. The product gas, hydrogen fluoride, is emitted through the mixture of fluorspar and silica out port 20. It is mixed with inert gases and water vapor and may be separated from them by condensation.

In the reaction, about 80 percent of the water is converted to hydrogen fluoride, or about 45 pounds. The concentration of the hydrogen fluoride produced and removed from the heat reaction zone is 90 percent.

EXAMPLE 2

In this example, the following reaction is carried out:

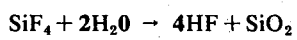

$$SiF_4 + 2H_2O \rightarrow 4HF + SiO_2$$

Gaseous material containing $SiF_4$ is introduced into the augmented flame (produced in the same manner as Example 1), and converted to HF in accordance with the above equation. The products of reaction are quenched and gaseous HF is thereafter separated from the resulting $SiO_2$ solids.

While the preferred embodiments of the present invention have been described, it is to be understood they may be otherwise embodied within the scope of the invention as defined by the appended claims.

What is claimed is:

1. A process for producing hydrogen fluoride which comprises maintaining a mixture comprising calcium fluoride and silica in the presence of water vapor at a reaction temperature above about 3500° F., wherein said reaction temperature is maintained by an electrically augmented flame burner emitting flames at a temperature above about 4000° F. and wherein at least a portion of said water is supplied by the combustion of fuel in said flame burner, thereby forming hydrogen fluoride and recovering the hydrogen fluoride from such mixture.

2. The process of claim 1 in which said reaction is carried out at a temperature between about 3500°F. and about 5000°F.

* * * * *